United States Patent [19]

Currie et al.

[11] 3,729,676
[45] Apr. 24, 1973

[54] RATEMETER

[75] Inventors: James R. Currie, Ralph R. Kissell, both of Huntsville, Ala.

[73] Assignee: The United States of America as represented by the Administrator of the National Aeronautics and Space Administration

[22] Filed: July 13, 1971

[21] Appl. No.: 162,101

[52] U.S. Cl. ............................. 324/78 E, 128/206 F
[51] Int. Cl. ......................... G01r 23/02, A61b 5/04
[58] Field of Search ................. 324/78 R, 78 E, 78 J, 324/163; 328/140; 128/2.05 T, 2.06 F

[56] References Cited

UNITED STATES PATENTS 3,614,634  10/1971  Jones et al. ........................... 328/140
3,599,627  8/1971  Millen .............................. 128/2.05 T Primary Examiner—Alfred E. Smith
Attorney—L. D. Wofford, Jr. et al.

[57] ABSTRACT

An instantaneous reading tachometer in which reoccurring events to be measured in rate, trigger a three-state timing generator in which the first two states are of fixed duration and the third state is of variable duration. An electrical decay circuit is set to a reference level by the second state and the third state causes this reference level to decay until the re-occurrence of an event. This triggers a new first state which in turn triggers a sample and hold circuit to hold the decayed level. The decayed level is amplified and provided as an output indicative of the instantaneous rate of occurrence of the last two successive events.

4 Claims, 3 Drawing Figures

INVENTORS
JAMES R. CURRIE
RALPH R. KISSEL

ATTORNEY
George J. Porter

INVENTORS
JAMES R. CURRIE
RALPH R. KISSEL
ATTORNEY

RATEMETER

ORIGIN OF THE INVENTION

The invention described herein was made by employees of the United States and may be manufactured and used by or for the Government of the United States of America for Governmental purposes without the payment of any royalties thereon or therefor.

BACKGROUND OF THE INVENTION

This invention relates to rate measurement devices or tachometers and particularly to an improved tachometer capable of instantaneous rate measurement of relatively low rate occurrences.

GENERAL DESCRIPTION OF THE PRIOR ART

Heretofore the electrical measurement of the rate of occurrence of re-occurring events has generally included the process of developing a pulse of a constant width and amplitude for each occurrence of an event and then the pulses so obtained charge a capacitor connected in a relatively long time constant circuit. The resulting voltage on the capacitor thus varies with the number of pulses applied to the capacitor within a predetermined time and thus there is developed a voltage which may be measured to give an indication of average rate of occurrence of the pulses and thus the rate of occurrence of the events. The difficulty with this approach is that it is not capable of providing an accurate rate output after the occurrence of only a relatively few events and there are instances in which there exists a need to provide an essentially instantaneous rate output, that is after the occurrence of only two or three such events. For example, it is often necessary or desirable in the measurement of heart rate to provide an instantaneous indication after the observation of only two or three heart beats, or to give continually updated beat-by-beat rate information. An alternate approach is to employ digital circuitry wherein events would be counted and the time measured between two or more succeeding counts. The disadvantage of this approach is that the circuitry is fairly complex.

SUMMARY OF THE INVENTION

Accordingly, it is an object of this invention to provide an improved rate measurement system capable of instantaneous measurements with a relatively simple combination of electrical circuit elements.

A further object of this invention is to provide an improved rate measurement system particularly adapted for the measurement on a beat-by-beat basis of heart rate.

These and other objects, features and advantages are accomplished in the present invention which encompasses an electronic system employing an event sensor, a three-state pulse generator, a decay circuit and a sample and hold circuit. The three states of the pulse generator are three voltage levels, the first and second of which last for predetermined periods. The duration of the third state is variable, it being cut off on the occurrence of a sensed event. For purposes of description, we will assume that a complete cycle has occurred and thus two events, the rate of occurrence of which it is desired to be measured, have occurred and there has occurred a full cycle of the three states. The occurrence of the first event triggers the pulse generator and a first state or voltage level is provided. It functions to cause the decay circuit to hold the value which it had reached by a previous cycle. Next and upon the occurrence of the second voltage state the decay circuit is reset to a reference voltage which is held until the occurrence of the third state after which this voltage is permitted to decay as a function of time until the occurrence of the next sensed event. When this occurs the pulse generator switches the decay circuit to "hold decayed level," which level is fed to the sample and hold circuit which stores this voltage and provides it as an output representative of the rate of occurrence of the last two events.

DESCRIPTION OF THE PREFERRED EMBODIMENT

Figure 1:
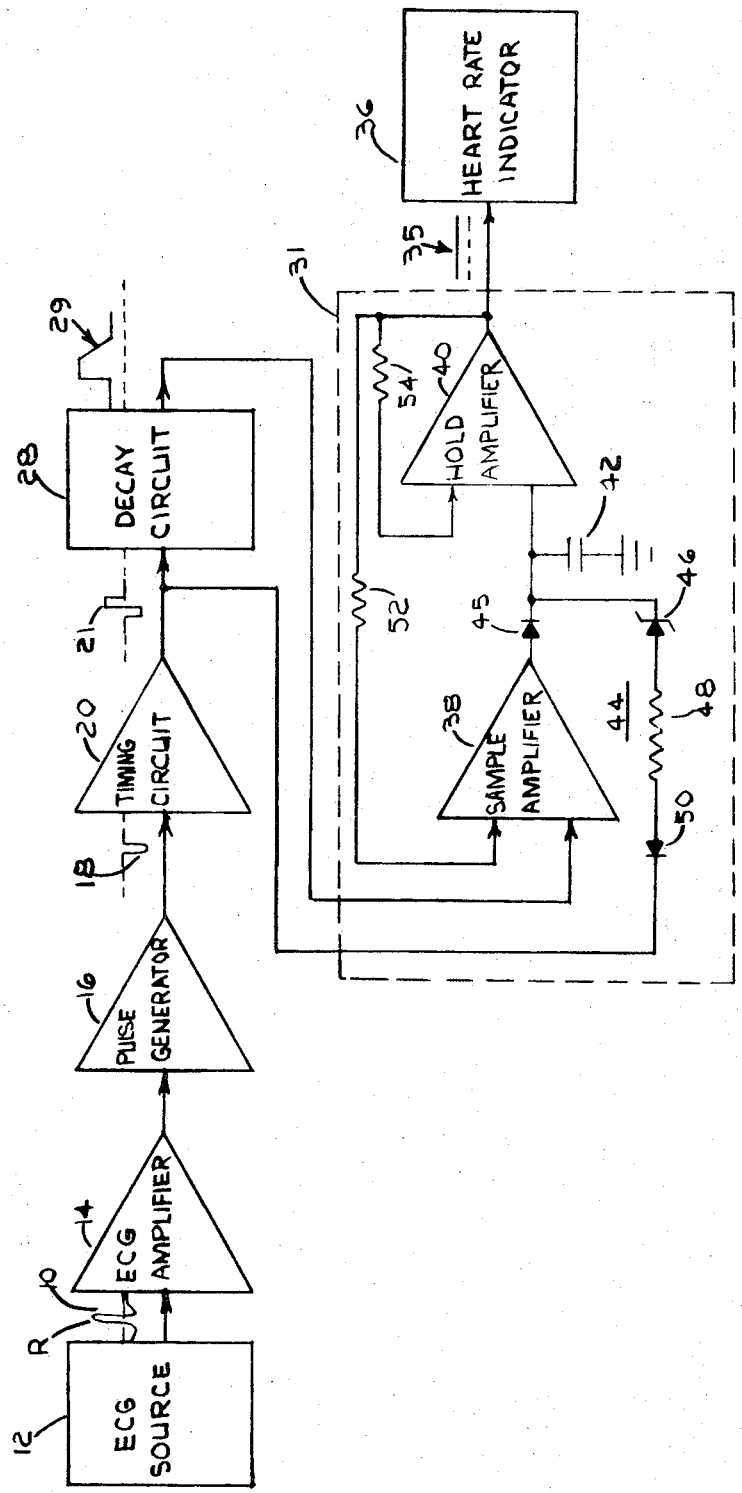
FIG. 1 is an electrical block diagram of an embodiment of the invention.

FIG. 1 illustrates broadly the invention as applied to a heart rate monitor. An ECG signal 10 is obtained in a conventional manner from a patient, represented by ECG source 12, and applied to ECG amplifier 14 which includes an appropriate feedback circuit to intensify the R portion of the ECG waveforms. The ECG output of amplifier 14 is fed to pulse generator 16 which generates a narrow negative pulse output 18 corresponding in time to the R portion of waveform 10. Three successive such pulses are shown in FIG. 2a and are labeled 18a, 18b and 18c.

Figure 2:
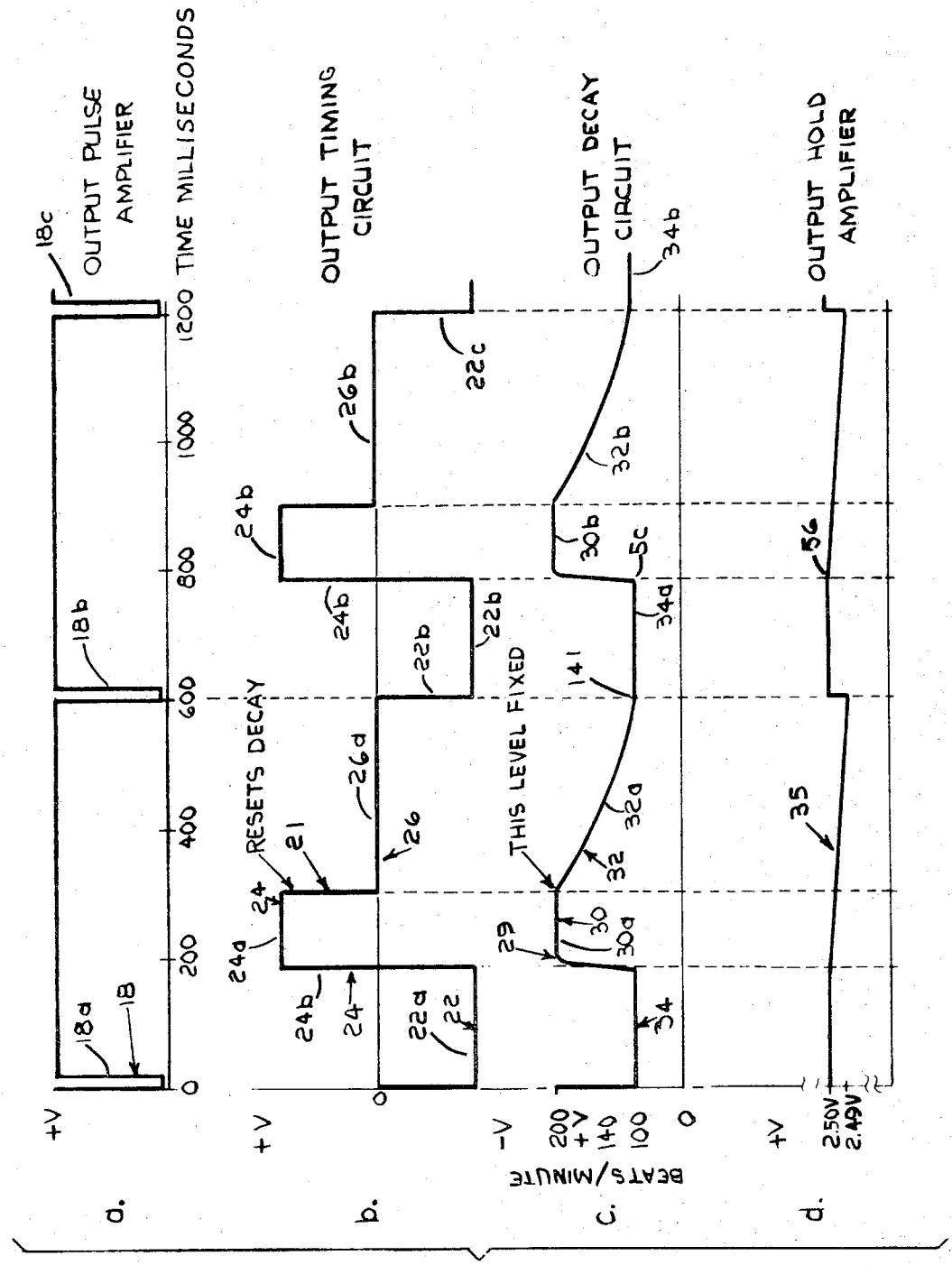
FIG. 2 shows a series of graphs illustrative of operation of the embodiment of the invention shown in FIG. 1.

In response to a negative pulse 18, FIG. 2a, timing circuit 20 generates a three state or level waveform 21 consisting of three discrete levels 22, 24 and 26 (FIG. 2b). As shown, the first of these levels, level 22, is in the form of a negative pulse which lasts for 183 milliseconds. The second level 24 is in the form of a positive pulse and it lasts for 117 milliseconds. Depending upon the rate to be counted, the first and second levels would each be of a duration of 1 to 2000 milliseconds. The third level 26 is at zero level and its duration is variable, it commencing at the end of positive pulse 24 and terminating on the occurrence of the next sensed event or pulse 18. As shown, the first series of pulses are labeled with the suffix a, the second by the suffix b and the third by the suffix c. Decay circuit 28 is controlled by the output of timing circuit 20 and it provides output waveform 29 more particularly shown in FIG. 2c. As will be noted, it is activated at the end of each negative level or pulse 22 by an output from timing circuit 20 to establish a reference voltage level 30 which lasts for the duration of positive pulse 24 (FIG. 2b). At the end of pulse 24, this reference voltage is permitted to decay, as decay voltage 32, until the occurrence of the next event and a pulse 18b. Pulse 18b then triggers negative pulse 22b which in turn causes the instantaneous level of decay voltage 32a to be held as level 34a for the duration of negative pulse 22b.

Sample and hold circuit 31 functions to sample the output of decay circuit 28 during held decayed levels 34 and to provide an output 35 proportional to the value of held decayed level 34 to heart rate indicator 36. Sample and hold circuit 31 basically consists of sample amplifier 38, hold amplifier 40, hold capacitor 42 and discharge circuit 44. During the periods of negative pulses 22, the output of decay circuit 28, represented by held decayed level 34, is applied as an input to sample amplifier 38 and it in turn applies a charging current through diode 45 to capacitor 42 which charges capacitor 42 to the held decayed level. If the charge on capacitor 42 (from the last sample) should happen to be higher than the present input level of amplifier 40, discharge circuit 44 consisting of Zener diode 46, resistor 48 and diode 50 provide a unidirectional discharge path back to the output terminal of timing circuit 20, which path is effective during negative output pulse 22. This discharges capacitor 42 to a level sufficiently low to insure that capacitor 42 will respond to the new charge applied to it. The value of resistor 48 and characteristic of Zener diode 46 are chosen so that the maximum discharge of capacitor 42 will be no more than 50 percent of the maximum voltage developed across resistor 48 and this is adequate to permit a drop from sampling to sampling representative of 200 to 40 beats per minute.

Hold amplifier 40 amplifies and couples the output of capacitor 42 to rate indicator 36 which is an electrical voltmeter or other appropriate readout calibrated in terms of heart rate. Feedback resistor 52 between the output of hold amplifier 40 and input of sample amplifier 38 insures the proper level of charge on capacitor 42. Feedback resistor 54 connects between the output and input of hold amplifier 40 and insures the accuracy of operation of hold amplifier 40. The value of resistor 54 is chosen to provide a desired operating range for hold amplifier 40 and in the present case the output is selected to have a range of zero to five volts, representative of a heart rate of 40 to 200 beats per minute and heart rate indicator 36 is so calibrated. At the end of the sample time, point in time 56 (FIG. 2d), the output of hold amplifier 40 remains at the level determined by capacitor 42 until the next sample pulse. It will be noted that the vertical scale of FIG. 2d is substantially enlarged and thus the decay in voltage due to circuit loss between sampled outputs of decay circuit 28 are extremely small and thus the only significant changes in output will be those determined by the output of decay circuit 28 indicating a change in sensed rate.

Figure 3:
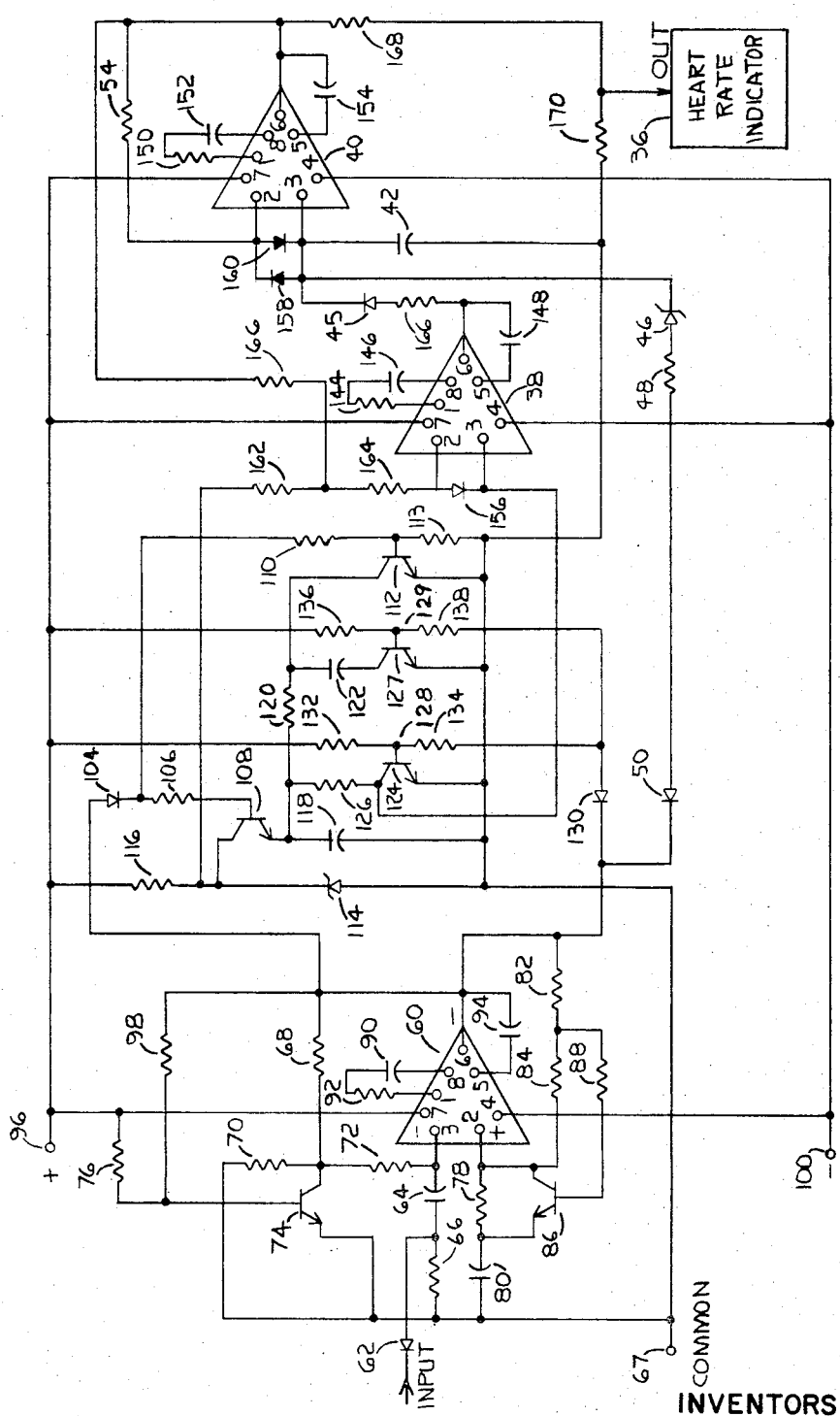
FIG. 3 is an electrical schematic diagram of certain of the circuitry shown in block form in FIG. 1.

Timing circuit 20, decay circuit 28 and sample and hold circuit 31 are shown in greater detail in FIG. 3 and will be further described with respect to these figures.

Timing circuit 20 must perform a complex function. First it must have a negative state for the sample and hold phase, then it must have a positive state to reset decay circuit 28 to a maximum and finally it must return to a zero state at precisely 300 milliseconds from the start of the cycle. The 300 milliseconds is the period for a heart rate of 200 beats per minute. Amplifier 60 of timing circuit 20 is a standard type LM709 integrated circuit, differential, operational amplifier. The input circuit of one input, pin 3, includes input diode 62, and capacitor 64 in series with input resistor 66, connected between pin 3 and common terminal 67. The time constant of this input circuit is relatively small to differentiate input pulse 18 to provide a very steep pulse to pin 3. Positive feedback is provided from output pin 6 of amplifier 60 by means of a voltage divider consisting of resistors 68 and 70 connected between pin 6 and common terminal 67 and through resistor 72 to pin 3. Transistor 74 is employed to selectively short resistor 70, resistor 70 being connected across the emitter-collector circuit of transistor 74. A base input operating bias is applied to the base of transistor 74 through resistor 76. The second input of amplifier 60, pin 2, is connected through series resistor 78 and capacitor 80 to common terminal 67. A negative feedback path from output pin 6 is provided through resistors 82 and 84 to pin 2 and the emitter-collector circuit of transistor 86 is connected across resistor 78 to provide for the selective accelerated discharge of capacitor 80. The base input of transistor 86 is driven through resistors 82 and 88 from pin 6.

Series connected capacitor 90 and resistor 92 provide desired input frequency compensation and are connected between pins 1 and 8 of amplifier 60. Capacitor 94 is connected between pins 5 and 6 to provide desired output frequency compensation. Positive source terminal 96 connects directly to pin 7, through resistor 76 to the base of transistor 74 and through resistor 98 to pin 6 of amplifier 60. Negative source terminal 100 connects directly to pin 4 of amplifier 60.

To consider the operation of timing circuit 20, it will be noted that prior to the application of an input pulse, the voltage at input pins 2 and 3 and output pin 6 of amplifier 60 are all at a zero level. With a zero potential on the collector of transistor 74, it is not operating and similarly with no base or collector voltage on transistor 86 it is not operating. Upon the application of the first negative pulse 18a (FIG. 2a) through capacitor 64 to negative input pin 3, the voltage on output pin 6 is caused to change in a negative direction. It is to be noted that the output on pin 6 is in phase with the input on pin 3 and out of phase with the input on pin 2. The negative going signal on pin 6 is fed back through resistors 68 and 72 as a positive feedback to pin 3 causing regeneration in amplifier 60 to rapidly saturate it as shown by negative output pulse or level 22a (FIG. 2b). This negative output at pin 6 is fed as negative feedback through resistors 82 and 84 to input pin 2 and through resistor 78 to capacitor 80. Neither transistors 74 or 86 are affected by the negative output or level 22a.

As a result of the feedback circuit to pin 2 and to capacitor 80, the voltage at pin 2, initially at zero, changes in a negative direction as capacitor 80 charges. When the negative voltage on pin 2 exceeds that of the negative voltage on pin 3, the differential input to amplifier 60 reverses in polarity and pin 3 becomes positive with respect to pin 2. This causes the output on pin 6 to change in a positive direction, rising toward zero. By virtue of the positive feedback from pin 6 to pin 3 the rising voltage on pin 3 causes the output voltage on pin 6 to rapidly rise through zero to its saturated positive level 24a. As the voltage on pin 6 rises above zero it causes transistor 74 to be energized and resistor 70 to be shorted out pulling the potential on pin 3 to zero.

Thus at the beginning of level 24a there exists a zero potential on pin 3 (which value remains on pin 3 for the duration of level 24a), a negative potential, approximately 5 volts, on capacitor 80 and on pin 2, and a maximum positive potential on pin 6. With a negative potential on capacitor 80 and a positive potential on pin 6 of amplifier 60 an operating bias is applied to transistor 86, to the collector through resistors 82 and 84 and to the base through resistors 82 and 88 (with respect to common terminal 67). This results in resistor 78 being shorted out and capacitor 80 to commence discharging through a first discharge path consisting of resistors 82 and 84 and a second discharge path through resistor 82, resistor 88, and the base-emitter circuit of transistor 86. This is a lower impedance path than existed during the charging of capacitor 80 with the result that the discharge of capacitor 80 is accelerated. As a result the voltage at pin 2 rises to near zero in 117 milliseconds. When this occurs amplifier 60 is pulled out of saturation and by virtue of negative feedback from pin 6 to pin 2 the output level is rapidly pulled down to zero potential or level 26a as shown in FIG. 2b after a period of a few microseconds. Level 26a will be retained until the occurrence of pulse 18b and thus there has just been described a complete cycle of operating of timing circuit 20. Pulse 18b triggers pulse 22b and thereafter pulses 24b and 26b occur in the manner just described.

Decay circuit 28 is driven by an output on pin 6 of amplifier 60 of timing circuit 20. The input to decay circuit 28 is polarized by diode 104 to permit passage of only a positive pulse or level 24 which is applied through resistor 106 to the base of transistor 108 and through resistor 110 to the base of transistor 112. Resistor 113 divides the input voltage to transistor 112 to a selected operating level. A reference potential is provided across Zener diode 114 which is connected to positive terminal 96 through resistor 116. When operated on, transistor 108 applies this reference potential to capacitor 118. While there is also created a circuit through resistor 120 to capacitor 122, since transistor 112 is turned on at the same time, no charge is applied to capacitor 122. Transistor 124 provides a selective discharge path for capacitor 118 through resistor 126, and transistor 127 provides a selective discharge path for capacitor 122. Transistors 124 and 127 are simultaneously switched by voltage dividers 128 and 129, respectively, connected between positive terminal 96 through diode 130 back to pin 6 of amplifier 60 of timing circuit 20. The base of transistor 124 is connected between series resistors 132 and 134 of voltage divider 128 and the base of transistor 127 is connected between series connected resistors 136 and 138 of voltage divider 129. By means of this circuitry, transistors 124 and 127 are turned off during the negative pulse or level 22 output of timing circuit 20 and are turned on during levels 24 and 26.

To consider operation of decay circuit 28, it will be assumed that the output of timing circuit 20 has just changed to positive level 24a. This level of potential is applied through diode 104 and through resistor 110 to transistor 112 to cause it to turn on and discharge any charge on capacitor 122. At the same time, current flows through resistor 106 to turn on transistor 108 and apply a reference level 30a from Zener diode 114 to capacitor 118. At the termination of level 24a, transistors 108 and 112 turn off and capacitor 118 starts its decay through resistor 126 and "on" transistor 124. Transistors 124 and 127 are "on" when the level on pin 6 of amplifier 60 is either zero or positive and "off" when this level is negative. The role of capacitor 122 is to linearize decay and improve the accuracy of the system. Initially, during the decay, it receives a charge through resistor 120 (transistor 112 now being turned off) as capacitor 118 discharges. At a desired point in the discharge of capacitor 118, capacitor 122 ceases charging and commences to discharge and thus slows the decay of voltage on capacitor 118. The process is abruptly stopped upon the occurrence of negative pulse 18b to cause the output level of amplifier 60 to go negative to level 22b, causing diode 130 to fully conduct and sufficiently lower the base potential on transistors 124 and 127 to turn them off. This point is indicated by point 141 of FIG. 2c, which marks the beginning of "held decayed level" 34a, which is the useful output of decay circuit 28. During other intervals, when the output levels of timing circuit 20 are either zero or positive, transistor 124 is turned on and thus the output of decay circuit 28, at the collector of transistor 124, is zero.

Sample and hold circuit 31 consists basically of sample amplifier 38, hold amplifier 40 and storage capacitor 42. The sample and hold amplifiers are identical to amplifier 60 of timing circuit 20 and are biased in a like manner. Sample amplifier 38 has an input frequency compensation network consisting of resistor 144 and capacitor 146 connected in series between pins 1 and 8 and an output frequency compensation circuit consisting of capacitor 148 connected between pins 5 and 6. Similarly, hold amplifier 40 employs an input frequency compensation network consisting of resistor 150 and capacitor 152 connected in series between pins 1 and 8 and an output frequency compensation capacitor 154 connected between terminals 5 and 6. A diode limiter 156 is connected across input terminals 2 and 3 of sample amplifier 38, and oppositely connected diodes 158 and 160 limit the magnitude, positive or negative, of signals applied between terminals 2 and 3 of amplifier 40. A reference input to pin 2 of amplifier 38 is applied from positive terminal 96 through resistors 116, 162 and 164. A feedback connection is provided from pin 6 of hold amplifier 40 back through resistors 166 and 164 to pin 2 of sample amplifier 38 and resistor 54 is connected in a feedback loop from the pin 6 output to the pin 2 input of hold amplifier 40. Output pin 6 of sample amplifier 38 is connected through resistor 166 and diode 45 to the pin 3 input of hold amplifier 40. Storage or hold capacitor 42 is connected between pin 3 of amplifier 40 and common terminal 67 and serves to provide a holding or storage function for sample and hold circuit 31. Zener diode 46 and resistor 48 in series with diode 50 serve to reduce, as explained above, the voltage on capacitor 42 to a level sufficiently low to insure that capacitor 42 will be appropriately charged despite rapid decreases in levels represented by rapid decreases in input rate to the system.

To consider the operation of sample and hold circuit 31 it will be assumed that negative pulse 22a (FIG. 2b) has just been initiated and the output level 34 (FIG. 2c) is applied to pin 3 of sample amplifier 38. Since transistors 124 and 127 of timing circuit 28 have been turned off by pulse 22a, as explained above, the potential or level 34 on capacitor 118 is held for the duration of pulse 22a. With this "held" level or "held decayed level" 34 applied to pin 3 of sample amplifier 38, there is a like or proportional output on output pin 6 of sample amplifier 38 which is applied through resistor 166 and diode 45 to pin 3 of hold amplifier 40 and thus across storage capacitor 42. Storage capacitor 42 is of a relatively large value, on the order of 10 microfarads, and it assumes the output voltage of amplifier 38. Negative feedback provided through resistors 166 and 164 assure that amplifiers 38 and 40 will have a stable gain and provide a linear output and thus an extremely accurate output. The output of hold amplifier 40 is fed through resistor 168 and appears across resistor 170 and is fed to heart rate indicator 36. As described above, the output of hold amplifier 40 has a range of zero to five volts, representative of a heart rate of 40 to 200 beats per minute which is indicated by rate indicator 36.

The cycle of operation just described repeats with each input pulse 18 and the output rate indicated by heart rate indicator 36 is that of the re-occurrence rate of the last two occurring events.

While this invention is believed particularly useful in its application to heart rate measurement systems it is to be appreciated that it has application to rate measurements in general, particularly where there is a need for the accurate, instantaneous measurement of rates below approximately 2,000 events per second.

What is claimed is:

1. A ratemeter comprising:
  A. sensing means responsive to re-occurring events, for providing an electrical output, timing, pulse of a first polarity upon the occurrence of each event;
  B. timing means responsive to each said output pulse of said sensing means for providing, successively, and on a reoccurring basis, first, second and third discrete electrical levels, said first and second electrical levels being of predetermined duration and the duration of said third level being equal to the period between said output pulses less the total duration of said first and second electrical levels, and wherein said timing means comprises:
    1. a differential amplifier having a first input, a second input and an output, said first input and said output being of like phase and said second input being of opposite phase to that of said output,
    2. first circuit means connecting a portion of the output voltage present on said output to said first input and including first switching means connected to said first input and responsive to a second polarity output of said amplifier for shorting said first input,
    3. second circuit means comprising:
      a capacitor having one terminal connected to a reference potential,
      a resistor connected between the other terminal of said capacitor and said second input,
      a circuit connecting said output through said resistor to said capacitor, and
      second switching means connected across said resistor and responsive to a second polarity output of said amplifier for shorting said resistor between said capacitor and said second input,
      whereby with an initial condition of zero voltage on said inputs there exists a zero voltage as said third discrete electrical level on said output,
    a said first polarity timing pulse applied to said first input causes said amplifier to provide a maximum first polarity output, or first discrete electrical level, which output is coupled to said capacitor which commences charging in a first polarity direction to provide an increasing amplitude first polarity input to said second input and timing the duration of said first discrete electrical level,
    when the level of said first polarity voltage on said second input exceeds the level on said first input the differential input of said amplifier switches polarity and the potential on said output changes to a maximum second polarity value as said second discrete electrical level, and
    said second switching means is operated by said second polarity from said output shorting said resistor and causing said capacitor to commence discharging, timing said second discrete electrical level, and when the voltage on said second input is pulled down to a point which causes the differential amplifier to abruptly change from said second electrical discrete level to a neutral state with a zero output, said third discrete electrical level is provided on said output, which level remains until the re-occurrence of a said timing pulse;
  C. decay circuit means responsive to the output of said timing means and to the initiation of said second electrical level for establishing a reference voltage and including time constant means responsive to the initiation of said third level for providing a voltage which initially corresponds to said reference voltage, then decays during said third electrical level to a decayed level, and including means responsive to the next occurring said first electrical level for halting said decay and holding the decayed level for the duration of said next occurring first electrical level; and
  D. sample and hold means responsive to said decay circuit means and said decayed level for providing a substantially continuously level output proportional to the last held decayed level and which is representative of the rate of occurrence of the last two successive said events.

2. A ratemeter as set forth in claim 1 wherein the duration of said first electrical level is between 1 and 2000 milliseconds and the duration of said second electrical level is between 1 and 2000 milliseconds.

3. A ratemeter as set forth in claim 1 wherein said first electrical level is of a positive potential, said second electrical level is of a negative potential and said third electrical level is of a zero electrical potential.

4. A ratemeter as set forth in claim 1 wherein said decay circuit means comprises means for providing an output which is equal to said decayed level during said first electrical level and is substantially zero during said second and third electrical levels.

* * * * *